No. 787,710. PATENTED APR. 18, 1905.
H. C. WHITE.
TOOL FOR BUDDING.
APPLICATION FILED SEPT. 5, 1902.
Fig. 1.
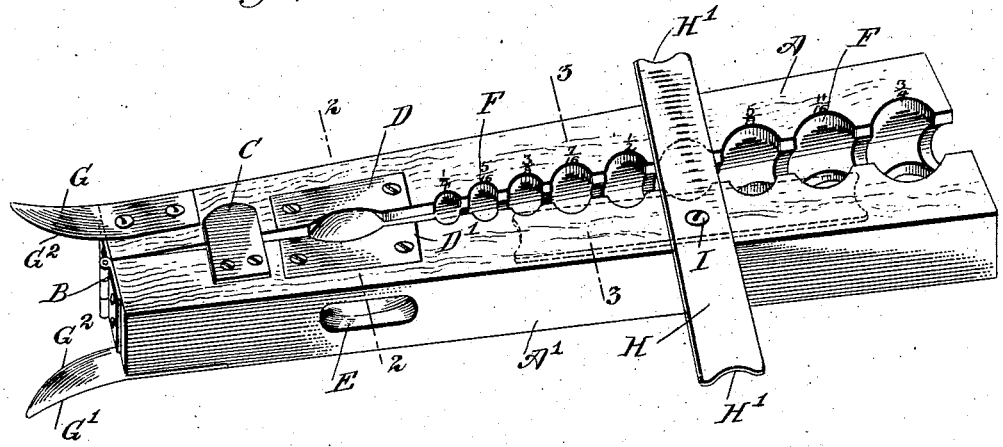
Fig. 2. Fig. 3. Fig. 4.
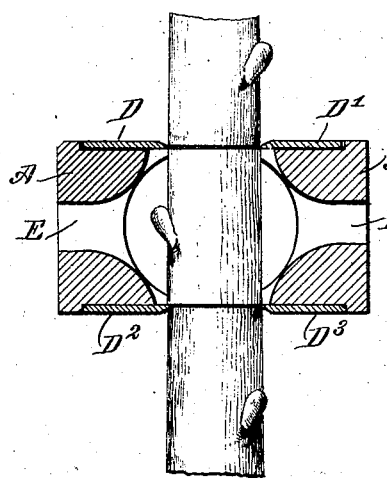 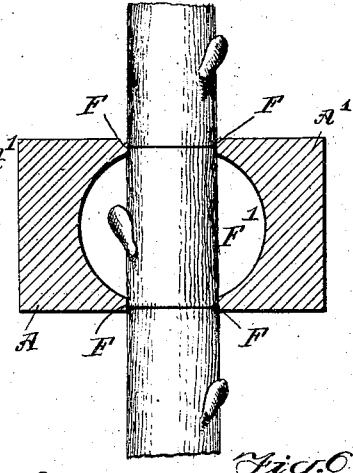 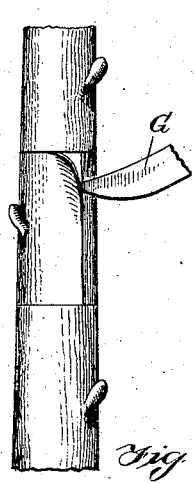
Fig. 5.
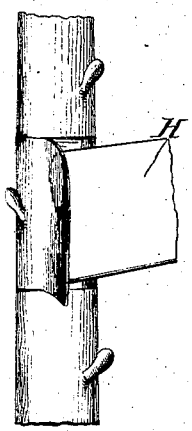
Fig. 6. Fig. 7.
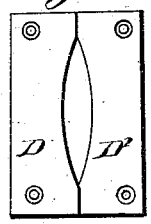 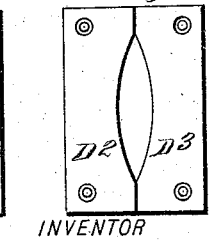
WITNESSES:
INVENTOR
Herbert Charles White
BY
ATTORNEYS.

No. 787,710. Patented April 18, 1905.

UNITED STATES PATENT OFFICE.

HERBERT CHARLES WHITE, OF VALDOSTA, GEORGIA.

TOOL FOR BUDDING.

SPECIFICATION forming part of Letters Patent No. 787,710, dated April 18, 1905.

Application filed September 5, 1902. Serial No. 122,201.

*To all whom it may concern:*

Be it known that I, HERBERT CHARLES WHITE, a citizen of the United States, and a resident of Valdosta, in the county of Lowndes and State of Georgia, have invented a new and Improved Tool for Budding Nut, Fruit, Shade, and Forest Trees, of which the following is a full, clear, and exact description.

The invention relates to implements for removing that portion of the bark of a tree containing the bud to be transplanted onto another tree.

The object of the invention is to provide a new and improved budding tool or implement which is simple and durable in construction, easily manipulated, and arranged to enable the operator to correctly gage and engirdle the tree, twig, limb, or branch to detach the bark portion carrying the bud without injury to the chit or eye of the bud and to allow of viewing the bud during the girdling operation.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is an enlarged cross-section of the same as applied, the section being on the line 2 2 of Fig. 1. Fig. 3 is a like view of the same on the line 3 3 of Fig. 1. Fig. 4 is a side elevation of the tree, showing the knife applied for making the longitudinal cut. Fig. 5 is a like view of the same, showing the peeling instrument applied. Fig. 6 is a view of the upper set of cutters detached, and Fig. 7 is a similar view of the lower set of cutters.

The implement is provided with handles A and A', connected with each other at one end by a hinge B to allow the operator to conveniently swing the handles A and A' toward and from each other when using the device, as hereinafter more fully described.

The handles A and A' are preferably provided with suitable guide-plates C to hold the handles in a proper position and secure perfect alinement when closing the same. On the top and bottom of the handles A and A' are secured sets of cutters D D' and $D^2$ $D^3$, of which the set of cutters D and D' is let in flush with the top face of the handles A and A', while the set of cutters $D^2$ and $D^3$ is flush with the bottom of the handles, and the said sets are located vertically opposite each other, as plainly indicated in Figs. 1 and 2, and the cutters in each set have their cutting edges opposite each other and concaved to produce a proper cut in the bark of the tree, twig, limb, or branch to be engirdled. The lower cutters $D^2$ and $D^3$ are fractionally more recessed or concaved than the upper cutters D and D' to compensate for the different diameters of the tree, twig, limb, or branch at the points where the cuts are made, as will be readily understood by reference to Fig. 2, it being understood that a tree, twig, limb, or branch tapers gradually from the base toward its terminal. The arrangement described prevents any tendency to make spiral cuts when the device is used.

The handles A and A' are hollowed out between the cutting edges of the sets of cutters D D' and $D^2$ $D^3$, so as to leave that portion of the bark containing the bud completely untouched, thus preventing injury to the bud in moving the tool around the tree, twig, limb, or branch.

Each of the handles A and A' is formed with transversely-extending peep holes or openings E, leading to the cut-out portions in the handles between the sets of cutters, so as to enable the operator to view the buds during the engirdling operation.

On the opposite faces of the handles A and A', between the sets of cutters and the outer ends of the handles, are arranged half-round graduated registering recesses, so that when the handles are closed the said half-round recesses form graduated calipering-holes F to enable the operator to caliper the tree, twig, limb, or branch operated on. The calipering-holes can be identified either by having their sizes marked on one or both of the handles or they may be referred to by consecutive numerals or other identification-signs. The calipering-holes F are hollowed out or concaved, as at F', in the sides of the handles A and A', so as to allow sufficient room for the petiole or leaf-stalk. The calipering-holes enable the operator when in doubt as to the respective sizes of the tree, twig, limb, or branch to caliper both the tree-stock and propagating-wood, thus insuring when desired that the sleeve or collar containing the bud will meet around the tree-stock, and thereby make a perfect union.

The hinged ends of the handles A and A' are provided with projecting knives G and G', each having its inner and outer edges curved and sharpened to a knife-edge to permit of using the knives for cutting leaves and the like, it being understood that the points of the knives G and G' are used for forming the longitudinal cut or slit in the portion of the bark engirdled by the sets of cutters D D' and $D^2 D^3$. (See Fig. 4.) The knives G and G' are arranged for use by right or left handed persons.

On one of the handles A or A' is arranged a peeling-blade H, preferably pivoted on the member, as indicated at I in Fig. 1, and this blade has its outer ends concaved, as at H'. The blade H is preferably made of ivory, bone, or other suitable hard material and serves for detaching the ring, sleeve, or collar of the bark containing the bud from the limb, twig, or branch from which the bud to be transplanted is taken without coming in contact with and thereby injuring the chit or eye of the bud where the latter is attached to the alburnum or sap-wood of the tree, limb, twig, or branch. By placing the blade H on a pivot I the operator is enabled to hold the blade at any desired angle or in the position most convenient during the peeling operation, as indicated in Fig. 5, and to allow of swinging or folding the blade upon a handle when not in use, as indicated in dotted lines in Fig. 1.

In using the device the handles A and A' are opened and closed transversely around the tree, twig, limb, or branch as nearly as possible at right angles with that portion of the tree, twig, limb, or branch desired to be girdled, and then the handles A and A' are pressed toward each other by the operator at their outer ends to cause the cutters D D' and $D^2 D^3$ to cut through the bark to the cambium layer, alburnum, or sap-wood, as plainly indicated in Fig. 2. The tool is now moved around the tree, twig, limb, or branch until the latter is completely girdled, which, owing to the shape of the cutters, requires not much more than moving the tool around one-third of the radius. By this construction it will be found that trees standing as close together as three inches and even a lesser distance can be conveniently budded. After the bark on the budding wood has been completely girdled one of the knives G or G' is used to cut the sleeve or collar of the bark, as indicated in Fig. 4, and then the abutting ends are slightly raised with the point of the knife G or G', after which either end of the blade H is inserted beneath the bark at the longitudinal cut, and the sleeve or collar of the bark is then peeled off to disconnect the same and to allow of removing the same from the tree, twig, limb, or branch. The transplanted bud is wrapped firmly with waxed cloth or other material to exclude air and moisture.

Having thus described my invention, I claim as new and desire to secure by Letters Patent—

1. A budding or girdling implement for annular or ring budding, having handles provided with cutters, and a calipering device on the inner faces of the handles and independent of the cutters, as set forth.

2. A budding or girdling implement comprising handles hinged at one extreme end and provided with cutters, and registering half-round recesses in opposite faces of the handles to form graduated calipering-holes, said calipering-holes being independent of the cutters, as set forth.

3. A budding or girdling implement having handles hinged together, and knives secured on the said handles and arranged in opposite directions, to allow the use of the knives by right or left handed persons.

4. A budding or girdling implement having handles hinged together, and knives secured on the said handles and arranged in opposite directions, to allow the use of the knives by right or left handed persons, the inner and outer edges of the said knives being curved, as set forth.

5. A budding or girdling implement having two handles hinged together at one end, a knife at the hinged end of each handle, and sets of oppositely-disposed cutters secured to the top and bottom of the handles and having their cutting edges concaved, the lower cutters being fractionally more recessed or concaved than the upper cutters, as set forth.

6. A budding or tree-girdling implement for annular or ring budding, comprising hinged handles, and sets of oppositely-disposed cutters secured to the top and bottom of the handles and having their cutting edges concaved, the lower cutters being fractionally more recessed or concaved than the upper cutters to compensate for the different diameters of the tree or branch at the points where the cuts are made, thereby preventing the cutters from making a spiral cut, as set forth.

7. A budding or girdling implement having handles hinged together, knives secured on the said handles, and sets of oppositely-disposed cutters on the handles, as set forth.

8. A budding or girdling implement having two handles hinged together at one end, sets of oppositely-disposed cutters secured to the top and bottom of the handles, and a series of registering half-round recesses in the inner faces of the handles to form graduated calipering-holes, the said calipering-holes being located between the said cutters and the free ends of the handles, as set forth.

In testimony whereof I have signed my name to this specification in the presence of two subscribing witnesses.

HERBERT CHARLES WHITE.

Witnesses:
JOHN R. COWAN,
G. M. BACON.